(12) United States Patent
Bierbaumer et al.

(10) Patent No.: US 11,014,610 B2
(45) Date of Patent: May 25, 2021

(54) CHASSIS COMPONENT FOR A MOTOR VEHICLE, AND METHOD FOR PRODUCING A CHASSIS COMPONENT

(71) Applicant: Bayerische Motoren Werke Aktiengesellschaft, Munich (DE)

(72) Inventors: Andreas Bierbaumer, Prutting (DE); Philipp Engelhardt, Landshut (DE); Elmar Jaeger, Munich (DE); Ruediger Keck, Oberhaching (DE); Oleg Konrad, Ergolding (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/435,728

(22) Filed: Jun. 10, 2019

(65) Prior Publication Data

US 2019/0291781 A1    Sep. 26, 2019

Related U.S. Application Data

(63) Continuation of application No. PCT/EP2018/052067, filed on Jan. 29, 2018.

(30) Foreign Application Priority Data

Mar. 17, 2017    (DE) .................... 10 2017 204 464.0

(51) Int. Cl.
*B62D 21/00*    (2006.01)
*B62D 29/00*    (2006.01)
(Continued)

(52) U.S. Cl.
CPC ............ *B62D 21/00* (2013.01); *B60G 7/001* (2013.01); *B62D 29/004* (2013.01); *B62D 65/02* (2013.01);
(Continued)

(58) Field of Classification Search
CPC ............ B60G 7/001; B60G 2206/014; B60G 2206/10; B60G 2206/7101; B60G 2206/7104; B62D 21/00
See application file for complete search history.

(56) References Cited

U.S. PATENT DOCUMENTS 4,813,697 A * 3/1989 Takada ................. B62K 25/283
                                                      156/91
4,841,801 A * 6/1989 Tice ........................ F16C 7/026
                                                      123/197.3
(Continued)

FOREIGN PATENT DOCUMENTS

DE        101 53 799 A1    5/2003
DE    10 2008 046 991 A1    3/2010
(Continued)

OTHER PUBLICATIONS

German-language Search Report issued in counterpart German Application No. 102017204464.0 dated Jul. 30, 2019 with partial English translation (11 pages).
(Continued)

*Primary Examiner* — Tony H Winner
*Assistant Examiner* — Harold Eric Pahlck, III
(74) *Attorney, Agent, or Firm* — Crowell & Moring LLP

(57) ABSTRACT

A chassis component for a motor vehicle has a core module with at least one first load-conducting element, at least one second load-conducting element and at least one load transfer element connecting the at least one first load-conducting element and the at least one second load-conducting element, and an insert molding. A method for producing the chassis component first of all produces the core module by joining the at least one first load-conducting element and the at least one load transfer element and also the at least one load transfer element and the at least one second load-
(Continued)

conducting element, and then overmolds the produced core module.

16 Claims, 3 Drawing Sheets

(51) Int. Cl.
    *B62D 65/02*      (2006.01)
    *B60G 7/00*      (2006.01)

(52) U.S. Cl.
    CPC .. *B60G 2206/013* (2013.01); *B60G 2206/014* (2013.01); *B60G 2206/10* (2013.01); *B60G 2206/7101* (2013.01); *B60G 2206/7104* (2013.01)

(56) References Cited

U.S. PATENT DOCUMENTS

| | | | | |
|---|---|---|---|---|
| 4,947,017 | A * | 8/1990 | Beck | B23K 11/314 |
| | | | | 219/86.25 |
| 4,992,313 | A * | 2/1991 | Shobert | B29C 53/582 |
| | | | | 428/36.1 |
| 5,406,033 | A * | 4/1995 | Pazdirek | B29C 70/347 |
| | | | | 174/167 |
| 6,202,505 | B1 * | 3/2001 | Auberon | B29C 33/52 |
| | | | | 74/579 R |
| 6,324,940 | B1 * | 12/2001 | Pazdirek | B29C 53/585 |
| | | | | 174/47 |
| 7,216,860 | B2 * | 5/2007 | Budde | B60G 7/001 |
| | | | | 267/188 |
| 8,870,202 | B2 * | 10/2014 | Teijeiro Castro | B60G 21/0551 |
| | | | | 280/124.106 |
| 2004/0045762 | A1 * | 3/2004 | Budde | B60G 7/001 |
| | | | | 180/312 |
| 2004/0070129 | A1 * | 4/2004 | Budde | F16C 7/026 |
| | | | | 267/188 |
| 2013/0113175 | A1 | 5/2013 | Renner et al. | |
| 2015/0033905 | A1 * | 2/2015 | Hoffmann | G05G 1/506 |
| | | | | 74/560 |
| 2016/0121532 | A1 * | 5/2016 | Kraibuhler | B29C 45/7693 |
| | | | | 264/40.1 |
| 2017/0058460 | A1 * | 3/2017 | Abramson | E01B 3/46 |
| 2017/0203798 | A1 * | 7/2017 | Bhosale | B60B 3/145 |
| 2018/0117999 | A1 * | 5/2018 | Thienel | B60J 5/0418 |
| 2018/0126885 | A1 * | 5/2018 | Hartmann | B60N 2/682 |
| 2018/0313442 | A1 * | 11/2018 | Ning | F16H 55/14 |

FOREIGN PATENT DOCUMENTS

| | | |
|---|---|---|
| DE | 10 2011 085 029 A1 | 4/2013 |
| DE | 10 2011 086 890 A1 | 5/2013 |
| DE | 10 2012 213 664 A1 | 2/2014 |
| DE | 10 2013 002 585 A1 | 8/2014 |
| DE | 10 2013 007 284 A1 | 10/2014 |
| DE | 10 2013 107 676 A1 | 1/2015 |
| WO | WO 2014/019787 A1 | 2/2014 |

OTHER PUBLICATIONS

International Search Report (PCT/ISA/210) issued in PCT Application No. PCT/EP2018/052067 dated May 2, 2018 with English translation (seven (7) pages).

German-language Written Opinion (PCT/ISA/237) issued in PCT Application No. PCT/EP2018/052067 dated May 2, 2018 (10 pages).

Lutter, "Organoblech-Prozesse komplett simulierbar," MaschinenMarkt, Jul. 24, 2012, Retrieved from the internet: URL:http://www.maschinenmarkt.vogel.de/organoblech-prozesse-komplett-simulierbar-a-372184/, XP055467829, (four (4) pages).

\* cited by examiner

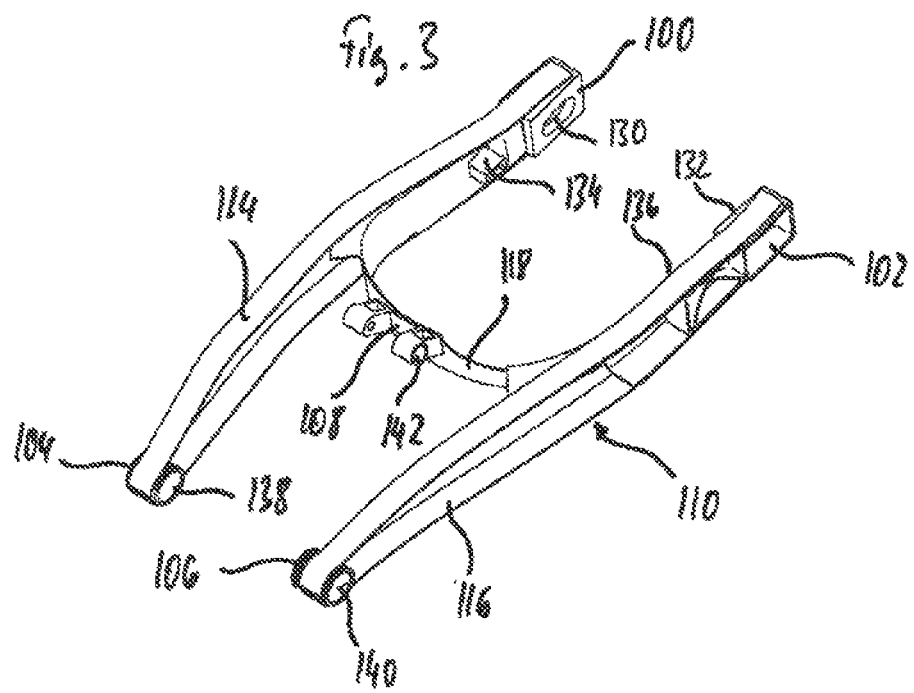
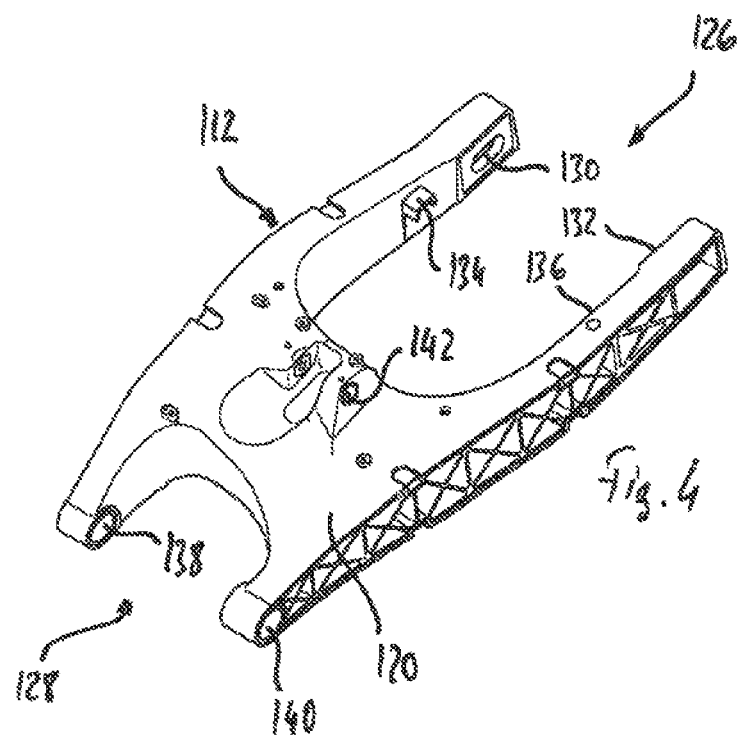

CHASSIS COMPONENT FOR A MOTOR VEHICLE, AND METHOD FOR PRODUCING A CHASSIS COMPONENT

CROSS REFERENCE TO RELATED APPLICATIONS

This application is a continuation of PCT International Application No. PCT/EP2018/052067, filed Jan. 29, 2018, which claims priority under 35 U.S.C. § 119 from German Patent Application No. 10 2017 204 464.0, filed Mar. 17, 2017, the entire disclosures of which are herein expressly incorporated by reference.

BACKGROUND AND SUMMARY OF THE INVENTION

The invention relates to a chassis component for a motor vehicle. Furthermore, the invention relates to a method for producing a chassis component of this kind.

DE 10 2008 046 991 A1 discloses a loadbearing fiber composite structural component, substantially comprising individual elements which fit together accurately and form a cavity between them, said elements consisting of preforms made from coated semifinished fiber products, wherein the structural component has a complex, branched geometry. The semifinished fiber products are based on carbon fibers, glass fibers, multi-fibers, aramid fibers and/or natural fibers. The fibers are arranged unidirectionally, crosswise and/or multiaxially in the semifinished fiber product. The individual elements have a U-shaped profile, a monolithic rectangular cross section and an I-shaped profile. In a rear section of lower individual elements with a U-shaped profile, inserts are introduced into the profile, serving to provide a transfer from a hollow box structure to a monolithic load introduction region in a rear part. Furthermore, cover and web inserts are used to reinforce the branched hollow box structure.

Moreover, DE 10 2008 046 991 A1 discloses a method for the integral production of a loadbearing, thick-walled fiber composite structural component with a complex, ramified geometry of hollow box construction by forming individual elements of the structural component to be produced from preforms by layered deposition of semifinished fiber products on the geometry of the structural component using matching preform tools and molding in such a way that the individual elements are bounded along the longitudinal extent thereof by three walls. The individual elements are formed monolithically and the individual elements have an I-shaped profile. The individual elements are machined to enable them to be fitted accurately one inside the other. The individual elements are inserted one inside the other into a resin injection tool in such a way that cavities are formed between the individual elements, wherein removable supporting cores are inserted into the cavities. The resin injection tool is closed and a resin is injected and cured under pressure and at elevated temperature to form the fiber composite structural component.

DE 10 2011 085 029 A1 discloses a stabilizer or stabilizer/control arm of fiber composite construction, being of integral construction without interruptions in the fibers, wherein the cross-sectional geometry, wall thickness and fiber path vary in such a way in the axial and the radial direction that the requirements arising from the available installation space and the loads to be expected are satisfied. The central part of the stabilizer, which is subject primarily to torsional stress, has a very largely circular cross section with a diameter and wall thickness profile which varies in the axial direction and is matched to the load and to the position of load introduction elements. The end pieces of the stabilizer, which are subject primarily to bending stress, have a cross-sectional shape and wall thickness matched to the bending load and to the attachment of the wheel suspension. The transitional regions have a cross-sectional shape and wall thickness matched to the combined torsional and bending load. To match the wall thickness to defined load regions, especially in bending regions and load introduction elements, textile inserts are introduced and/or the fiber deposition is increased or reduced.

Moreover, DE 10 2011 085 029 A1 discloses a method for producing a stabilizer or stabilizer/control arm of this kind, comprising the following steps: a preform is produced on a straight, flexible and contoured core by depositing fibers, preferably by means of braiding or winding. This preform is shaped into a bent geometry together with the core, is placed in a closed primary forming/forming tool shaped to match the bent geometry, in which the fibers are joined to a matrix material to form a laminate, which is compressed into its final shape by introducing an expanding material into the core and is then removed from the primary forming/forming tool.

DE 10 2013 002 585 A1 discloses a chassis link for a motor vehicle, comprising at least two bearing receptacles for various mounting elements and a connecting component made from fiber-reinforced plastic arranged between them, which is secured on corresponding shaft offsets of the bearing receptacles by adhesive bonds. An interior space of the connecting component is closed off in an airtight manner by the two adhesive bonds between the bearing receptacles and the connecting component. A pressure sensor for detecting the internal pressure in the interior space is arranged in the interior space, said sensor emitting a signal dependent on the internal pressure to a control unit.

Moreover, DE 10 2013 002 585 A1 discloses a method for producing a chassis link of this kind, comprising: providing two bearing receptacles for different mounting elements, providing a connecting component composed of fiber-reinforced plastic, securing a pressure sensor on a shaft offset from one of the bearing receptacles or on the connecting component, in the interior space thereof, in order to detect the internal pressure in the interior space, applying adhesive to the shaft offsets of the bearing receptacles, inserting and aligning the bearing receptacles and the connecting component in a production apparatus, inserting the bearing receptacles and connecting component one inside the other by means of the production apparatus and producing adhesive bonds between the connecting component and the bearing receptacles, thereby closing off the interior space of the connecting component in an airtight manner by way of the two adhesive bonds between the bearing receptacles and the connecting component, and monitoring the internal pressure and transmitting a signal dependent on the internal pressure in or on a control unit.

It is the underlying object of the invention to improve a chassis component mentioned at the outset structurally and/or functionally. Moreover, it is the underlying object of the invention to improve a method mentioned at the outset.

The object is achieved by a chassis component and by a method for producing the chassis component in accordance with embodiments of the invention.

The motor vehicle can be a motorcycle. The motor vehicle can be a passenger car. The chassis component can be a rear wheel swingarm. The chassis component can be a transverse link. The chassis component can have a rod-type shape. The chassis component can have a forked shape. The chassis component can have a first component end and a second component end situated opposite the first component end. The first component end and/or the second component end can take the form of extensions. The first component end and/or the second component end can have a forked shape.

The core module can form a subassembly that can be produced separately. The core module can be embodied in the manner of a skeleton. The core module can be flexible.

The at least one first load-conducting element and/or the at least one second load-conducting element can have a connecting section for connection to the load transfer element. The connecting section can have a surface with increased roughness. The connecting section can have a knurled surface. The connecting section can have at least one undercut. The at least one first load-conducting element and/or the at least one second load-conducting element can have a hub section. The hub section can be used to receive a bearing. The hub section can be used to receive an axle or shaft.

The at least one first load-conducting element and/or the at least one second load-conducting element can have a cuboidal shape. The at least one first load-conducting element and/or the at least one second load-conducting element can have a sleeve-type shape.

The at least one first load-conducting element and/or the at least one second load-conducting element can be produced from a metal. The metal can be a steel or aluminum alloy. The at least one first load-conducting element and/or the at least one second load-conducting element can be painted, at least in some section or sections. The at least one first load-conducting element and/or the at least one second load-conducting element can be coated, at least in some section or sections. The at least one first load-conducting element and/or the at least one second load-conducting element can be electrophoretically dip-coated.

The at least one first load-conducting element and/or the at least one second load-conducting element can have at least one further functional section. The at least one further functional section can be used to secure components on the chassis component.

The at least one first load-conducting element and/or the at least one second load-conducting element can be arranged at different component ends. The at least one first load-conducting element and/or the at least one second load-conducting element can be arranged at the same component end.

The at least one first load-conducting element can have a first transfer element end and a second transfer element end situated opposite the first transfer element end. The first transfer element end can be connected in a load-transferring manner to the at least one first load-conducting element. The second transfer element end can be connected in a load-transferring manner to the at least one second load-conducting element.

The at least one load transfer element can comprise fibers. The fibers can be organic fibers, such as aramid fibers, carbon fibers, polyester fibers, nylon fibers, polyethylene fibers or plexiglass fibers, and/or inorganic fibers, such as basalt fibers, boron fibers, glass fibers, ceramic fibers or silica fibers.

The at least one load transfer element can comprise unidirectionally arranged continuous fibers. The unidirectionally arranged continuous fibers can be arranged at an angle of at least approximately 0° to a main load direction orientation. The unidirectionally arranged continuous fibers can extend between the at least one first load-conducting element and the at least one second load-conducting element. The at least one load transfer element can comprise a UD carbon fiber tape.

The at least one load transfer element can comprise bidirectionally or multidirectionally arranged continuous fibers. Bidirectionally arranged continuous fibers can be arranged at least approximately at right angles to one another. Bidirectionally arranged continuous fibers can be arranged at an angle of at least approximately +/−45° to a main load direction orientation. The at least one load transfer element can have a form similar to a fairing. The at least one load transfer element can have a plate-like form. The at least one load transfer element can comprise an organosheet.

The fibers can be embedded in a matrix material. The matrix material can be thermoplastic. The matrix material can be polyamide, in particular PA 6 or PA 6.6. The matrix material can be polypropylene. The matrix material can be a thermoset.

The at least one load transfer element can comprise a metal. The metal can be a steel or aluminum alloy. The at least one load transfer element can have a round profile, an I-shaped profile or a T-shaped profile. The at least one load transfer element can have a hollow profile. The at least one load transfer element can be pre-shaped. The at least one load transfer element can have a bent shape.

The overmolding can comprise a fiber-filled plastic with a predetermined minimum proportion of recycled or secondary material consisting of scrap. The overmolding can comprise short and/or long staple fibers. The fibers can be organic fibers, such as aramid fibers, carbon fibers, polyester fibers, nylon fibers, polyethylene fibers or plexiglass fibers, and/or inorganic fibers, such as basalt fibers, boron fibers, glass fibers, ceramic fibers or silica fibers. The overmolding can comprise a thermoplastic. The overmolding can comprise polyamide, in particular PA 6.6. The overmolding or pressed surround can comprise a thermosetting plastic. The overmolding can have recesses. The overmolding can have reinforcing ribs.

The chassis component can have at least one reinforcing element arranged on the outside of the overmolding. The at least one reinforcing element can comprise bidirectionally or multidirectionally arranged continuous fibers. The fibers can be organic fibers, such as aramid fibers, carbon fibers, polyester fibers, nylon fibers, polyethylene fibers or plexiglass fibers, and/or inorganic fibers, such as basalt fibers, boron fibers, glass fibers, ceramic fibers or silica fibers. Bidirectionally arranged continuous fibers can be arranged at least approximately at right angles to one another. Bidirectionally arranged continuous fibers can be arranged at an angle of at least approximately +/−45° to a main load direction orientation. The at least one reinforcing element can have a form similar to a fairing. The at least one reinforcing element can have a plate-like form. The at least one reinforcing element can comprise an organosheet.

To produce the chassis component, a critical load path can first of all be identified. The critical load path can be isolated. The at least one load transfer element can be modeled along the critical load path. Overmolding of the core module can be simulated. A gating arrangement can be determined. Identification, isolation, modeling, overmolding and/or the gating arrangement can be performed/determined with the aid of a computer program.

The at least one first load-conducting element, the at least one load transfer element and the at least one second load-conducting element can be joined together nonpositively, positively and/or materially to produce the core module. During the subsequent overmolding of the core module, the overmolding can be used to establish a further loadbearing connection between the at least one first load-conducting element, the at least one load transfer element and the at least one second load-conducting element. The at least one load transfer element can be fully overmolded. The at least one load transfer element can be partially overmolded to enable the load transfer element to be held during overmolding.

The at least one load transfer element and/or the at least one reinforcing element can be produced from a pre-impregnated semifinished fiber product. The at least one load transfer element can be produced from a dry semifinished fiber product and can be infiltrated during overmolding.

The overmolding and the at least one reinforcing element can then be joined. The at least one reinforcing element can be produced from a pre-impregnated semifinished fiber product and can be infiltrated during overmolding. The at least one reinforcing element can first of all be produced separately and then joined to the overmolding. The overmolding and the at least one reinforcing element can be joined nonpositively, positively and/or materially. The overmolding and the at least one reinforcing element can be welded to one another. The overmolding and the at least one reinforcing element can be welded to one another in a peripheral edge region. The overmolding and the at least one reinforcing element can be welded to one another at reinforcing ribs of the at least one reinforcing element.

By means of the invention, CFRTP construction can be made available to the chassis sector. CFRTP construction is a type of construction involving carbon fiber reinforced thermoplastics. Plastics that are established in vehicle construction can be used. There is a reduction in weight. There is a reduction in outlay, e.g. costs. There is an improvement in durability.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 3 shows a core module of a motorcycle rear wheel swingarm with load introduction elements and load transfer elements.

FIG. 4 shows a motorcycle rear wheel swingarm with a core module and an overmolding.

DETAILED DESCRIPTION OF THE DRAWINGS

Figure 1:
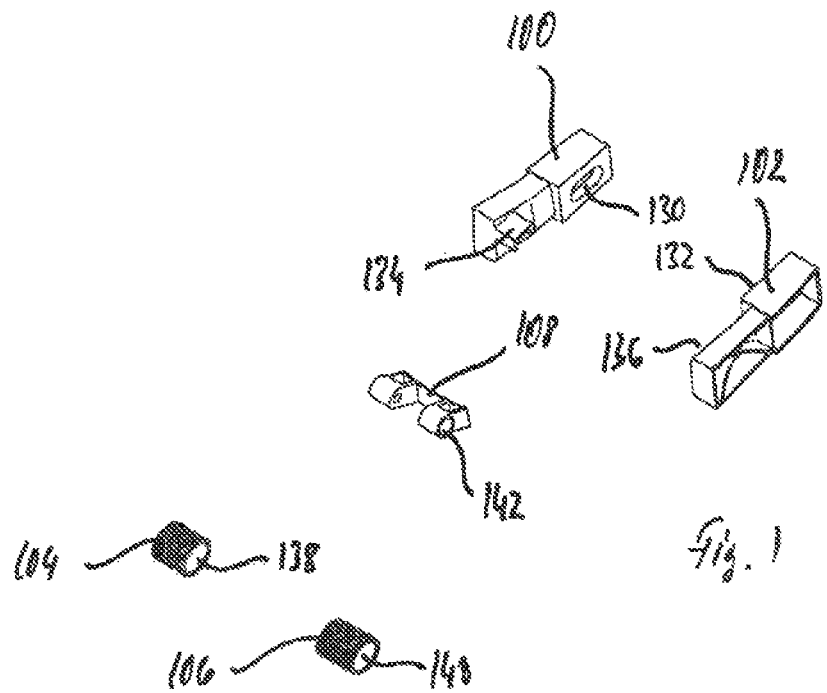
FIG. 1 shows load introduction elements of a core module of a motorcycle rear wheel swingarm.
Figure 2:
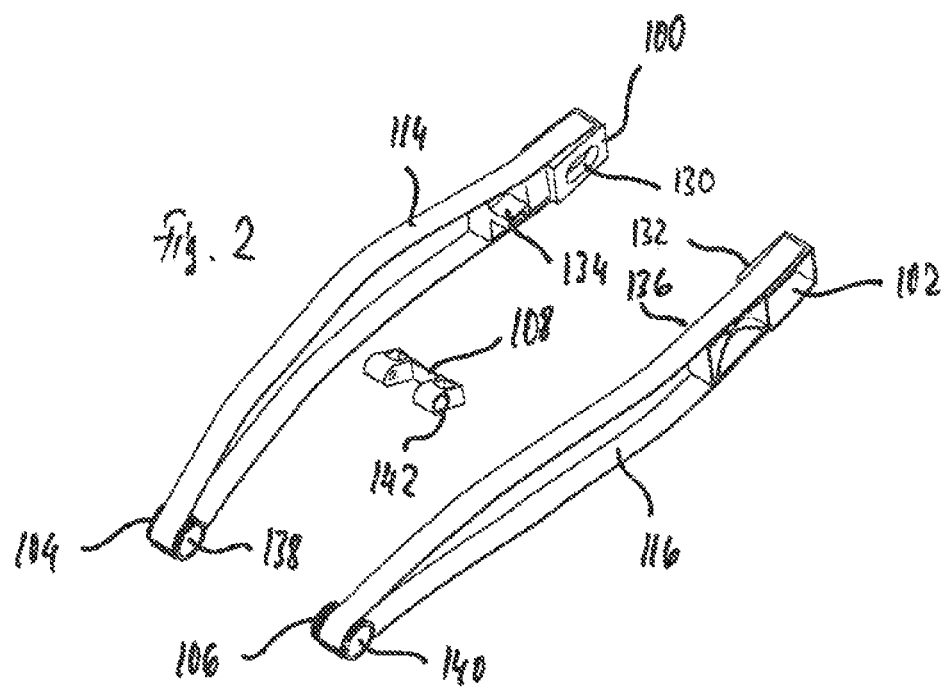
FIG. 2 shows load introduction elements and load transfer elements of a core module of a motorcycle rear wheel swingarm.
Figure 5:
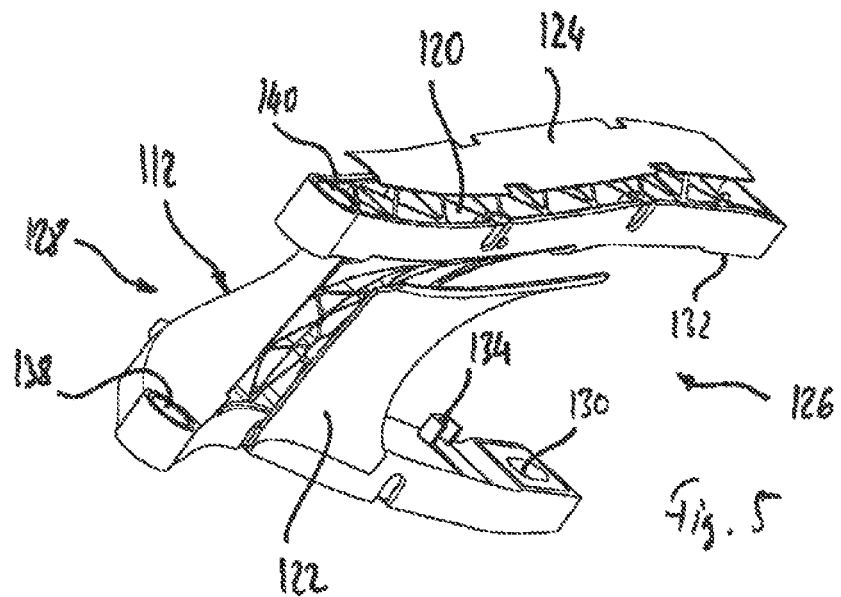
FIG. 5 shows a motorcycle rear wheel swingarm with a core module, an overmolding and reinforcing elements.
Figure 6:
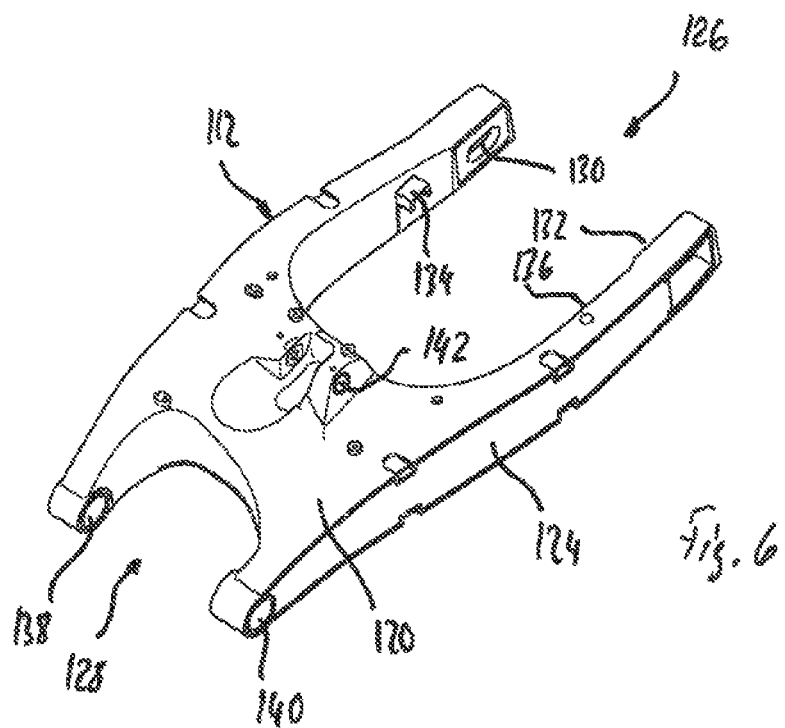
FIG. 6 shows a motorcycle rear wheel swingarm with a core module, an overmolding and reinforcing elements.

FIG. 1 shows load introduction elements 100, 102, 104, 106, 108 of a core module 110 of a motorcycle rear wheel swingarm 112. FIG. 2 shows load introduction elements 100, 102, 104, 106, 108 and load transfer elements 114, 116 of a core module 110 of a motorcycle rear wheel swingarm 112. FIG. 3 shows the core module 110 with the load introduction elements 100, 102, 104, 106, 108 and load transfer elements 114, 116, 118. FIG. 4 shows the motorcycle rear wheel swingarm 112 with the core module 110 and an overmolding 120. FIG. 5 and FIG. 6 show the motorcycle rear wheel swingarm 112 with the core module 110, the overmolding 120 and reinforcing elements 122, 124.

In the present case, the invention is explained with reference to a motorcycle rear wheel swingarm 112. However, the invention can also be used for other chassis components, e.g. a transverse link on a passenger car.

The motorcycle rear wheel swingarm 112 has the core module 110 with the load introduction elements 100, 102, 104, 106, 108 and the load transfer elements 114, 116, 118. The motorcycle rear wheel swingarm 112 has two mutually opposite swingarm ends 126, 128. The swingarm ends 126, 128 each have a forked shape.

The load introduction elements 100, 102 are arranged on the swingarm end 126. The load introduction elements 100, 102 serve to receive a rotatable vehicle wheel. The load introduction elements 100, 102 each have a connecting section on the outside for connection to a load transfer element 114, 116 and a hub section 130, 132 in the form of an elongate hole to receive a bearing or an axle or shaft. The load introduction elements 100, 102 each have a cuboidal shape. The load introduction elements 100, 102 each have a further functional section 134, 136 for securing components, such as a brake. The load introduction elements 100, 102 are each produced from a steel or aluminum alloy and are of lightweight construction with recesses and reinforcing ribs and are coated by cathodic dip coating.

The load introduction elements 104, 106 are arranged on the swingarm end 128. The load introduction elements 104, 106 are used to connect the motorcycle rear wheel swingarm 112 pivotably to a vehicle frame. The load introduction elements 104, 106 each have a connecting section on the outside for connection to a load transfer element 114, 116 and a hub section 138, 140 to receive a bearing or an axle or shaft. The load introduction elements 104, 106 each have a sleeve-type shape. The load introduction elements 104, 106 are each produced from a steel or aluminum alloy and are coated by cathodic dip coating.

Load introduction element 108 is arranged approximately centrally on the motorcycle rear wheel swingarm 112. Load introduction element 108 is used for the pivotable reception of a spring strut. Load introduction element 108 has a connecting section on the outside for connection to load transfer element 118 and hub sections, such as 142, to receive a bearing or an axle or shaft. Load introduction element 108 is produced from a steel or aluminum alloy and is coated by cathodic dip coating.

Load transfer element 114 has two transfer element ends and a profile which is curved slightly several times, following a structural load path. The transfer element ends of load transfer element 114 are connected in a load-transferring manner to the load introduction elements 100, 104. Load transfer element 116 has two transfer element ends and a profile which is curved slightly several times, following a structural load path. The transfer element ends of load transfer element 116 are connected in a load-transferring manner to the load introduction elements 102, 106.

The load transfer elements 114, 116 each have a UD carbon fiber tape with unidirectionally arranged continuous fibers composed of carbon, which are arranged at an angle of about 0° to a main load direction orientation and extend between the load-conducting elements 100, 104 and the load-conducting elements 102, 106, respectively. The carbon fibers are embedded in a plastic matrix composed of PA 6 or PA 6.6. The load transfer elements 114, 116 are thus produced from a fiber-plastic composite with a unidirectional fiber orientation.

Load transfer element 118 comprises an organosheet with bidirectionally arranged continuous fibers composed of carbon, which are arranged approximately at right angles to one another and are each arranged at an angle of about +/−45° to a main load direction orientation. Load transfer element 118 has a U-type shape and extends between load-conducting elements 100, 102 and load-conducting element 108. The carbon fibers are embedded in a plastic matrix composed of PA 6 or PA 6.6. Load transfer element 118 is thus produced from a fiber-plastic composite with a bidirectional fiber orientation.

The core module 110 is overmolded with a fiber-filled plastic. The overmolding 120 comprises a predetermined minimum proportion of recycling material.

The overmolding 120 comprises multidirectionally arranged short and/or long staple fibers composed of carbon. The overmolding 120 largely surrounds the core module 110 and thus decisively determines the geometry of the motorcycle rear wheel swingarm 112. Hub sections 130, 132, the functional sections 134, 136, hub sections 138, 140 and hub sections 142 remain accessible. Sections of the load transfer elements 114, 116 likewise initially remain free to enable them to be held during overmolding. The overmolding 120 is of lightweight construction with recesses and reinforcing ribs.

The reinforcing elements 122, 124 are arranged on the outside of the overmolding 120. The reinforcing elements 122, 124 are embodied in the manner of fairings. The reinforcing elements 122, 124 are welded to the overmolding 120. Reinforcing element 122 is arranged centrally on a lower outer side of the motorcycle rear wheel swingarm 112. Two reinforcing elements, such as 124, are arranged laterally on the motorcycle rear wheel swingarm 112.

The reinforcing elements 122, 124 each comprise an organosheet with bidirectionally arranged continuous fibers composed of carbon, which are arranged approximately at right angles to one another and are each arranged at an angle of about +/−45° to a main load direction orientation. The carbon fibers are embedded in a plastic matrix composed of PA 6.6. The reinforcing elements 122, 124 are thus produced from a fiber-plastic composite with a bidirectional fiber orientation.

To produce the motorcycle rear wheel swingarm 112, a critical load path is first of all identified between the load-conducting elements 100, 102, 104, 106, 108, the critical load path is isolated, and the load transfer elements 114, 116, 118 are modeled along the critical load path. After this, the core module 110 is first of all produced by joining the load-conducting elements 100, 102, 104, 106, 108 and the load transfer elements 114, 116, 118. The core module 110 is then overmolded. The plastic matrix of the load transfer elements 114, 116, 118 and the overmolding 120 can have different melting temperatures. During overmolding, the load transfer elements 114, 116, 118 melt superficially, and a material bond is formed, thus making it possible to reduce or avoid phase separations and/or bonding seams.

Finally, the reinforcing elements 122, 124 are thermoplastically welded or adhesively bonded.

REFERENCE SIGNS 100 load introduction element
102 load introduction element
104 load introduction element
106 load introduction element
108 load introduction element
110 core module
112 chassis component, motorcycle rear wheel swingarm
114 load transfer element
116 load transfer element
118 load transfer element
120 overmolding
122 reinforcing element
124 reinforcing element
126 swingarm end
128 swingarm end
130 hub section
132 hub section
134 functional section
136 functional section
138 hub section
140 hub section
142 hub section The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A chassis component for a motor vehicle, comprising:
   a core module comprising:
      at least one first load-conducting element,
      at least one second load-conducting element and
      at least one first load transfer element connecting the at least one first load-conducting element and the at least one second load-conducting element,
      at least one second load transfer element, and
   an overmolding of the core module, wherein
      the at least one first load transfer element comprises unidirectionally arranged continuous fiber; and
      the at least one second load transfer element comprises bidirectionally or multidirectionally arranged continuous fiber.

2. The chassis component according to claim 1, wherein at least one of the first or second load transfer elements comprise a UD carbon fiber tape.

3. The chassis component according to claim 1, wherein the at least one second load transfer element comprises an organosheet.

4. The chassis component according to claim 1, wherein the overmolding comprises a fiber-filled plastic with a predetermined minimum proportion of recycled material.

5. The chassis component according to claim 1, further comprising:
   at least one reinforcing element arranged on an outside of the overmolding.

6. The chassis component according to claim 5, wherein the at least one reinforcing element comprises bidirectionally or multidirectionally arranged continuous fibers.

7. The chassis component according to claim 6, wherein the at least one reinforcing element comprises an organosheet.

8. A method for producing a chassis component comprising a core module with at least one first load-conducting element, at least one second load-conducting element and at least one load transfer element connecting the at least one first load-conducting element and the at least one second load-conducting element, and an overmolding of the core module, wherein the method comprises the acts of:
   producing the core module by joining the at least one first load-conducting element and the at least one load transfer element, and also the at least one load transfer element and the at least one second load-conducting element;
   overmolding the produced core module; and
   joining the overmolding at least one reinforcing element arranged on an outside of the overmolding, wherein the at least one reinforcing element comprises bidirectionally or multidirectionally arranged continuous fiber.

9. A chassis component for a motor vehicle, comprising:
   a core module comprising:
      at least one first load-conducting element,
      at least one second load-conducting element,
      at least one first load transfer element connecting the at least one first load-conducting element and the at least one second load-conducting element,
      at least one third load-conducting element,
      at least one fourth load-conducting element,
      at least one second load transfer element connecting the at least one third load-conducting element and the at least one fourth load-conducting element, and
      at least one third load transfer element extending between the first load-conducting element and the third load-conducting element; and
   an overmolding of the core module, wherein
      the at least one first load transfer element has unidirectionally arranged continuous fibers; and
      the at least one second load transfer element comprises bidirectionally or multidirectionally arranged continuous fibers.

10. The core module according to claim 9, further comprising:
   a load introduction element arranged on the at least one third load transfer element and configured to receive a spring strut.

11. The chassis component according to claim 9, further comprising:
   a hub section arranged on the at least one third load transfer element and configured to receive at least one of a bearing, an axle, or a shaft.

12. The method according to claim 8, further comprising the acts of:
   determining a gating arrangement of the overmolding; and
   overmolding the produced core module based on the determined gating arrangement.

13. The chassis component according to claim 1, wherein the overmolding comprises a plurality of multidirectional staple fibers.

14. The chassis component according to claim 5, wherein the at least one reinforcing element is a first reinforcing element that spans between the at least one first load transfer element and at least one second load transfer element.

15. The chassis component according to claim 14, further comprising:
   a second reinforcing element that spans between the at least one first load-conducting element and the at least one second load-conducting element; and
   a third reinforcing element that spans between at least one third load-conducting element and at least one fourth load-conducting element.

16. The chassis component according to claim 5, wherein the at least one reinforcing element is welded to the overmolding.

* * * * *